June 14, 1938.  J. P. BODLE  2,120,458
WATERPROOF SEAM AND METHOD OF MAKING SAME
Filed April 6, 1936
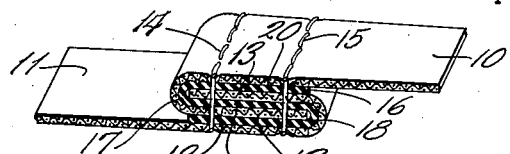
Fig. 1.
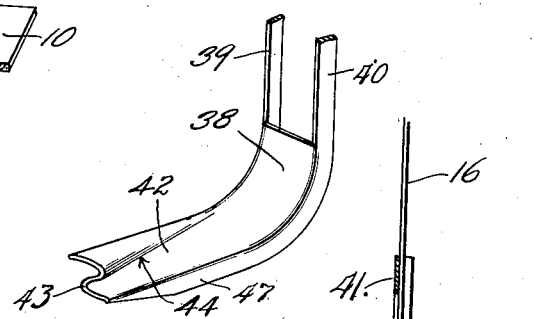
Fig. 5.
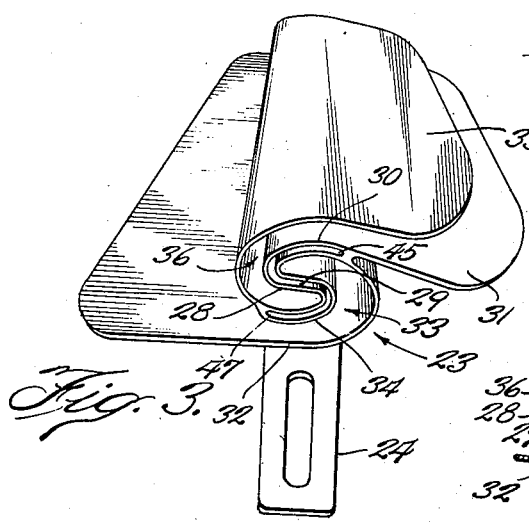
Fig. 3.
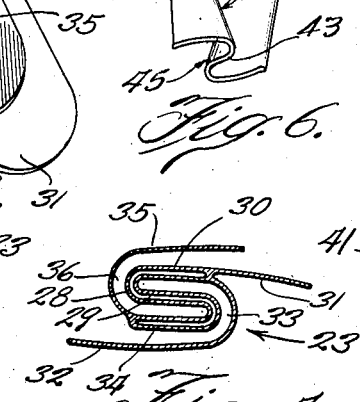
Fig. 6.
Fig. 4.
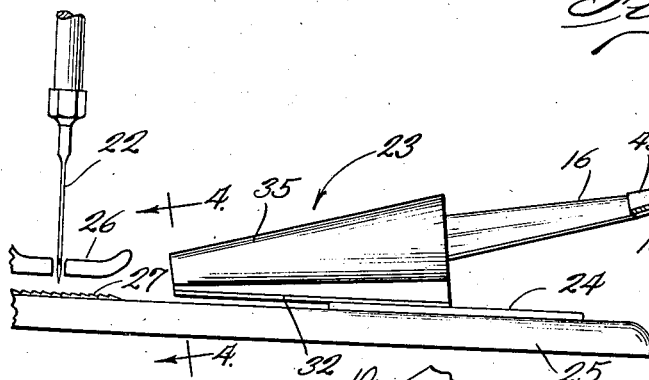
Fig. 2.
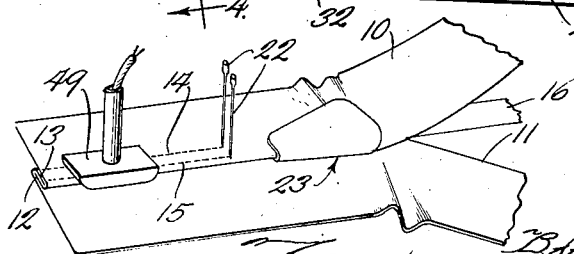
Fig. 7.
Inventor:
John P. Bodle
By Eugene M. Giles
Atty.

Patented June 14, 1938

2,120,458

UNITED STATES PATENT OFFICE 2,120,458

WATERPROOF SEAM AND METHOD OF MAKING SAME

John P. Bodle, Mishawaka, Ind., assignor to Mishawaka Rubber and Woolen Manufacturing Company, Mishawaka, Ind., a corporation of Indiana Application April 6, 1936, Serial No. 72,968

4 Claims. (Cl. 154—42)

My invention relates to waterproof seams for garments or other articles and has reference more particularly to a seam, and the method of making same, wherein a thin strip of rubber or similar sealing material is interposed and stitched between the parts composing the seam.

The principal objects of my invention are to provide an improved waterproof seam; to effectively and permanently seal the stitch openings; to insure uniformity of sealing throughout the seam; to minimize the amount of sealing material required; to permit the sealing to be accomplished without perceptible thickening or appreciable stiffening of the seam; and to provide a simple expedient whereby the waterproofing of the seam may be conveniently accomplished,— these and other objects being accomplished as pointed out hereinafter and as shown in the accompanying drawing in which:

Fig. 1 is a transverse sectional and perspective view of a seam made in accordance with my invention;

Fig. 2 is a side view of mechanism for producing the waterproof seam;

Fig. 3 is a perspective view looking at the receiving end of the seam folder;

Fig. 4 is an enlarged sectional view taken on the line 4—4 of Fig. 2 at the delivery end of the seam folder;

Fig. 5 is a fragmentary perspective view of the guide along which the strip of waterproofing material is fed to the seam folder;

Fig. 6 is a view of the delivery end of the guide of Fig. 5; and

Fig. 7 is a perspective view showing the seam as it is formed, stitched and pressed.

For waterproofing the seam, balata, gutta percha or other heat-softenable sealing material suitable for the purpose is employed and this sealing material is prepared in the form of a thin strip, as for example by calendering, and interposed between the seam forming parts so that the stitches pass therethrough, the seam being preferably subjected to heat and pressure after stitching so as to flatten the seam and at the same time soften and pack the heat-softenable sealing material in the stitch openings and around the thread.

One form of seam, waterproofed in accordance with this invention, is shown in Fig. 1 wherein the reference numerals 10 and 11 indicate the two pieces of material, such as fabric, which are joined together by the seam with their respective edge portions 12 and 13 doubled back so that the edges are secured within the seam by the stitches which pass therethrough. One or more rows of stitches may be employed, two rows being preferred as indicated at 14 and 15, and the edge portions 12 and 13 may fully overlap one another, as shown, so that both rows of stitches 14 and 15 pass through both edge portions 12 and 13 or these edge portions may merely be doubled back sufficiently to extend into the seam a suitable distance so that each is engaged by only one row of stitches, in which case the portions 12 and 13 do not necessarily overlap one another to any extent as the portion 12 may merely extend inwardly beyond the stitches 14 and the portion 13 may merely extend inwardly beyond the stitches 15 as will be readily understood by those familiar with the making of seams.

The strip of heat-softenable sealing material 16 which is incorporated in the seam and extends throughout the length thereof, is shown exaggerated in thickness for the purpose of illustration. This strip 16 is folded along longitudinal lines as at 17 and 18 to provide inner, outer and intermediate portions 19, 20 and 21 respectively, which are arranged as shown so that in the illustrated seam the portion 19 is between the doubled back fabric portion 12 and the outer fabric 11 of the seam and the portion 20 is between the doubled back fabric portion 13 and the outer fabric 10 of the seam and the portion 21 is between the doubled back fabric portions 12 and 13. Thus there are three layers of sealing material 16 between the inner and outer faces of the seam and the stitches 14 and 15 pass through all three layers.

For making the seam with the waterproofing strip 16 incorporated therein, a sewing machine having two needles 22 for making the two rows of stitches 14 and 15 simultaneously is provided with a combined strip and fabric folder indicated as a whole at 23, which is secured by a mounting strap 24 to the bed plate 25 of the sewing machine just ahead of the needles 22 and arranged to progressively fold and overlap the edge portions of the fabric pieces 10 and 11 in a manner to produce the seam while at the same time the strip 16 is progressively folded and introduced into the seam, the sewing machine being provided with the usual presser foot 26 and work feed 27 which cooperate to pull the work through the folder and propel it past the needles 22 which secure the seam parts together with the two lines of stitches 14 and 15.

This folder 23 is formed with a hollow S-shaped shell 28 at the center which extends from end to end of the folder and provides a passageway 29, of S-shaped cross section, through which the sealing strip 16 is drawn in the formation of the seam, said passageway 29 being of an open S-shape at the entering end remote from the needles 22, as shown in Fig. 3 and gradually contracting to a flattened S-shape as shown in Fig. 4 at the discharge end which is nearest to the needles 22. The upper arm 30 of the S-shaped shell 28 is provided with two plate extensions 31 and 32 forming a continuation thereof, the former of which, namely the plate extension 31, projects laterally and downwardly and provides a guide and support for the marginal portion of the fabric 10 as the edge portion thereof is drawn through the seam former and the latter of which, namely the plate extension 32, is curled outwardly and downwardly and across under the S-shaped shell 28 and terminates in a flat portion at the opposite side which supports and guides the marginal portion of the fabric 11 as the edge portion thereof is drawn through the seam former, the plate 32 together with the S-shaped shell 28 forming a C-shaped channel 33 which embraces the lower lobe of the S-shaped shell 28 and serves, as the marginal portion of the fabric 11 is fed through the former 23, to curl the edge portion of the fabric 11 up over the lower lobe shaped portion of the S-shaped shell so that the edge portion of the fabric is introduced between the portion of the sealing strip 16 that is in the center part of the sealing strip shell 28 and that portion thereof in the top arm 30 of the shell.

The lower arm 34 of the S-shaped shell 28 has a single plate extension 35 which is curled outwardly and upwardly and across over the S-shaped shell 28 and plate extension 31, and together with the plate 31 and S-shaped shell 28 forms an inverted C-shaped channel 36 which embraces the upper lobe of the S-shaped shell and serves, as the marginal portion of the fabric 10 is fed through the former 23, to curl the edge portion of the fabric 10 down under the upper lobe shaped portion of the S-shaped shell so that the edge portion of the fabric is introduced between the portion of the sealing strip that is in the center part of the sealing strip shell 28 and that portion thereof in the bottom arm 34 of the shell.

Both of the channels 33 and 36 extend from the entering end of the former 23 remote from the needles 22 to the delivery end thereof near the needles and these channels which are of open C shape at the entering end, as shown in Fig. 3, are gradually contracted to a flattened C shape at the delivery end as shown in Fig. 4 so that at the same time that the sealing strip 16 is being reduced to a flattened S form by passage thereof through the passageway 29 of the former, the edge portions of the fabrics 10 and 11 are being reduced in the channels 36 and 33 respectively to flattened C form and are folded around the folded sealing strip 16 so that the fabric edges emerge from the delivery end of the former 23 folded in substantially the seam form shown in Fig. 1 and with the sealing strip 16 incorporated therein substantially as shown in said figure so that upon compression in the stitching operation and stitching thereof the parts are secured together in the flat seam form.

Any suitable means may be provided for directing the sealing strip 16 to the entering end of the passageway 29 of the former, as for example through a guide 37 which may be mounted in any convenient manner, as for example by attachment to the sewing machine frame, the sealing material being supplied to the guide from any suitable source in the form of a thin strip which is pulled downwardly along the guide and into the folder 23 by the feed which advances the folded seam through the stitching zone, the guide being provided with a bend 38 at the lower end to re-direct the strip toward the entering end of the sealing strip passageway 29 of the folder 23. This guide may extend to the entering end of the passageway 29, if desired, and is formed between the bend 38 and the former 23 so as to preshape the strip so that it readily enters the passageway 29 in the open S form of the entering end of said passageway. In the illustrated structure the guide 37 comprises a pair of rails 39 and 40 which are joined together at intervals by connecting portions 41 and by the curved plate 38 in suitable spaced relation so as to accommodate the heat-softenable strip 16 edgewise therebetween, and the curved plate 38 has an extension or continuation 42 which projects toward the entering end of the passageway 29 and gradually changes from the flat form at the bottom of the curve 38 to a sort of S-shape at the outer end as indicated at 43 with reverse folds 44 and 45 which serve, as the strip 16 is drawn along under the extension 42 and therefrom to gradually convert the flat strip 16 into the required S-shape for entering the passageway 29. The rails 39 and 40 of the guide are continued as flanges beyond the curved plate 38 along the edges of the extension 42 as indicated at 46 and 47, these portions 46 and 47 being at different inclinations and convergent to correspond respectively to the edges of the extension 42, one of which said edges together with the side flange 46 is arranged to direct the corresponding edge of the strip 16 to the upper end of the S-shaped entrance to the passageway 29 and the other edge of the extension 42 and its side flange 47 being arranged to direct the other edge of the sealing strip 16 to the lower end of said S-shaped entrance. Thus with this guide, the sealing strip 16 is readily arranged for feeding into the passageway 29 of the folder as there are no openings through which the strip must be threaded as it is merely necessary to place the strip between the side rails 39 and 40 and the convergent flanged parts 46 and 47 thereof and under the curved plate 38, after which the drawing of the sealing strip 16 along the extension 42 and between the convergent flanged parts 46 and 47 starts the shaping of the sealing strip 16 in the S form which it assumes as it enters the passageway 29 of the folder.

In making the seam with this device, the sealing strip 16 after being engaged with the guide 37 is inserted through the passageway 29 of the folder 23 and the edges of the fabric parts 10 and 11 that are to be joined together by the seam are started respectively through the C-shaped channels 36 and 33 so that they emerge at the delivery end of the former 23 in the seam form with the sealing strip incorporated therein and these folded parts are then started between the presser foot 26 and work feed 27 which, as the stitching operation is proceeded with, pulls the materials through the folder 23 which progressively folds and overlaps the parts in the seam form at which time the operator merely manipulates the fabric parts 10 and 11 to direct the fabric edges into the respective C-shaped channels 36 and 33 in a manner to insure doubling back of the fabric edges in the manner desired for the seam.

After the seam has been completed it is heated and pressed to soften the sealing material 16 and pack it compactly between the fabric parts and into the stitch openings and around the stitches. This may be accomplished by introducing the entire garment into a heating compartment and subjecting the garment to a temperature of approximately 190 degrees Fahrenheit for about 45 minutes and thereafter hand pressing the seams with a roller before the garment cools, or if desired, a pressing device such as indicated at 49 may be provided which is heated electrically or otherwise to the required temperature and arranged to heat and press the seam as it leaves the stitching zone.

The sealing strip 16 while shown herein for purposes of illustration as comparatively thick, is in actual practice quite thin, sealing strips between three one-thousandths and ten one-thousandths of an inch in thickness having been found to be sufficient, and the width of sealing strip ordinarily employed in making this seam is about three-quarters of an inch. By preparing the sealing material in strip form and incorporating it into the seam in the manner above described as the seam is formed, the uniformity of thickness of sealing material throughout the length of the seam is assured and extremely thin stock may be employed, which not only minimizes the cost, but avoids any perceptible thickening or appreciable stiffening of the seam. Moreover, the employment of sealing material in the strip form permits accurate application thereof both as to area and thickness and the sealing material is confined to inside surfaces so there is no visible evidence thereof. Moreover, by applying the sealing material in the manner disclosed herein no preliminary treatment of the edges of the material for the making of the seam is required as the edges of the parts that are to be secured together by the seam are merely folded and stitched together, and along curved and irregular lines if desired, in the same manner and with the same facility as they would be without any sealing material, the sealing strip being automatically and accurately introduced into the seam in the same operations that are necessary to make the seam.

While I have shown and described my invention in a preferred form, I am aware and contemplate that forms of seams other than the particular form disclosed herein may be waterproofed or sealed in accordance with this invention and that various other changes and modifications may be made without departing from the principles of my invention, the scope of which is to be determined by the appended claims in which the term rubber-like material is intended to include not only balata and gutta percha but other sealing materials similar thereto which may be prepared in thin strips and used in the manner above described to effectively waterproof a seam.

I claim as my invention:

1. The method of making a water-proof seam, which comprises simultaneously feeding pieces of fabric and a heat-softenable water-proof sealing strip in substantial alignment in the same direction, progressively folding the moving pieces of fabric into a seam having overlapped portions, progressively shaping the moving sealing strip and feeding said shaped portion endwise in between the respective lapped seam portions of the pieces of fabric, stitching the seam through the pieces of fabric and the sealing strip, and subjecting the stitched seam to heat and pressure sufficient to soften the sealing strip and force softened portions thereof into the needle holes and around the stitching to form a water-tight seam.

2. The method of making a water-proof seam, comprising simultaneously feeding pieces of fabric and a heat-softenable water-proof sealing strip in substantial alignment in the same direction, progressively interfolding the moving pieces of fabric into interlocking relation, progressively shaping the moving sealing strip and feeding the shaped portions thereof endwise in between the interlocked portions of the said pieces of fabric, stitching through the interlocked portions of the pieces of fabric and the shaped portions of the sealing strip embraced thereby to form a seam, and subjecting the stitched seam to heat and pressure sufficient to soften the sealing strip and force softened portions thereof into the needle holes and around the stitching to form a water-tight seam.

3. The method of making a water-proof seam, which comprises simultaneously feeding pieces of fabric and a heat-softenable water-proof sealing strip in substantial alignment and in the same direction, progressively folding edge portions of the moving pieces of fabric into a seam having overlapped portions, progressively shaping the sealing strip into a substantially S-shaped cross section and feeding said S-shaped portion of the sealing strip endwise into the seam with respective portions of the S-shaped part of the strip between respective overlapped portions of the fabric, stitching through the folded fabric and sealing strip, and subjecting the stitched fold to heat and pressure sufficient to soften the sealing strip and force softened portions thereof into the needle holes and around the stitching to form a water-tight fold.

4. A water-proof fabric seam, comprising fabric sections having mutually overlapped edge portions interfolded into interlocked relation, and a water-proof heat softened sealing strip folded into a substantially S-shaped cross section lying within the seam, respective folded portions of the strip lying between respective overlapped folded portions of the fabric, and stitches passing through the overlapped portions of the folded fabric and the folded sealing strip, portions of the sealing strip being displaced and lying in the needle holes in the fabric and around the stitches by reason of heat and pressure applied to said seam and forming a water-proof seam.

JOHN P. BODLE.